United States Patent
Pugh et al.

(10) Patent No.: US 10,829,190 B1
(45) Date of Patent: Nov. 10, 2020

(54) TRIM CONTROL SYSTEM AND METHOD

(71) Applicant: Brunswick Corporation, Mettawa, IL (US)

(72) Inventors: Jason F. Pugh, Ripon, WI (US); Christopher R. Jenks, Rosendale, WI (US); Daniel P. Klawitter, Beaver Dam, WI (US); Aaron J. Ward, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 282 days.

(21) Appl. No.: 15/991,671

(22) Filed: May 29, 2018

(51) Int. Cl.
| | |
|---|---|
| *B63H 20/10* | (2006.01) |
| *B63B 39/06* | (2006.01) |
| *G05D 1/08* | (2006.01) |
| *G05D 1/02* | (2020.01) |
| *G05D 3/18* | (2006.01) |
| *B63B 79/00* | (2020.01) |

(52) U.S. Cl.
CPC ........... *B63H 20/10* (2013.01); *B63B 39/061* (2013.01); *G05D 1/0206* (2013.01); *G05D 1/0875* (2013.01); *B63B 79/00* (2020.01); *G05D 3/183* (2013.01)

(58) Field of Classification Search
CPC ..... B63H 20/10; B63B 39/061; G05D 1/0206
See application file for complete search history.

(56) References Cited

U.S. PATENT DOCUMENTS

| | | |
|---|---|---|
| 3,682,127 A | 8/1972 | Waquet |
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |
| 4,718,872 A | 1/1988 | Olson et al. |

(Continued)

FOREIGN PATENT DOCUMENTS

EP   2368791 B1   1/2013

OTHER PUBLICATIONS

Andrasko et al., "Systems and Methods for Automatically Controlling Attitude of a Marine Vessel with Trim Devices," Unpublished U.S. Appl. No. 14/873,803, filed Oct. 2, 2015.

(Continued)

*Primary Examiner* — S. Joseph Morano
*Assistant Examiner* — Jovon E Hayes
(74) *Attorney, Agent, or Firm* — Andrus Intellectual Property Law, LLP (57) ABSTRACT

A trim control system for controlling a relative position of a trimmable marine device with respect to a marine vessel hull includes a trim actuator coupled to the trimmable marine device about a horizontal trim axis. The trim control system further includes a trim control module executable on a processor and configured to identify a target trim position for the trimmable marine device, determine a desired trim rate of change to rotate the trimmable marine device about the horizontal axis from a current trim position toward a target trim position, and operate the trim actuator to rotate the trimmable marine device at the desired trim rate of change toward the target trim position.

20 Claims, 8 Drawing Sheets

(56) References Cited

U.S. PATENT DOCUMENTS

| | | |
|---|---|---|
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,063,381 A | 11/1991 | Ito |
| 5,113,780 A | 5/1992 | Bennett et al. |
| 5,118,315 A | 6/1992 | Funami et al. |
| 5,142,473 A | 8/1992 | Davis |
| 5,169,348 A | 10/1992 | Ogiwara et al. |
| 5,171,172 A | 12/1992 | Heaton et al. |
| 5,263,432 A | 11/1993 | Davis |
| 5,352,137 A | 10/1994 | Iwai et al. |
| 5,366,393 A | 11/1994 | Uenage et al. |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,015,318 A | 1/2000 | Uematsu et al. |
| 6,042,434 A | 3/2000 | Nakamura |
| 6,048,234 A | 4/2000 | Uematsu et al. |
| 6,095,077 A | 8/2000 | Deagro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,363,875 B1 | 4/2002 | Griffith et al. |
| 6,458,003 B1 | 10/2002 | Krueger |
| 6,583,728 B1 | 6/2003 | Staerzl |
| 6,733,350 B2 | 5/2004 | Iida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,506,599 B2 | 3/2009 | Mizutani |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,764,500 B2 | 7/2014 | Kuriyagawa et al. |
| 8,807,059 B1 | 8/2014 | Samples et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,278,740 B1 | 3/2016 | Andrasko et al. |
| 9,290,252 B1 | 3/2016 | Tuchscherer et al. |
| 9,359,057 B1 | 6/2016 | Andrasko et al. |
| 9,381,989 B1 | 7/2016 | Poirier |
| 9,463,858 B1 | 10/2016 | Remmers et al. |
| 9,643,698 B1 | 5/2017 | Andrasko et al. |
| 9,694,892 B1 | 7/2017 | Anschuetz et al. |
| 9,745,036 B2 | 8/2017 | Andrasko et al. |
| 9,751,605 B1 | 9/2017 | Anschuetz et al. |
| 9,919,781 B1 | 3/2018 | Andrasko et al. |
| 10,000,267 B1 * | 6/2018 | Anschuetz ............ B63H 20/10 |
| 10,054,956 B1 * | 8/2018 | Anschuetz ............ B63H 25/02 |
| 10,214,271 B1 * | 2/2019 | Gonring ................ B63H 21/21 |
| 10,281,928 B2 * | 5/2019 | Behling ............... G05D 1/0875 |
| 2003/0013359 A1 | 1/2003 | Suganuma et al. |
| 2003/0077953 A1 | 4/2003 | Kaji |
| 2005/0245147 A1 | 11/2005 | Takada et al. |
| 2007/0089660 A1 | 4/2007 | Bradley |
| 2008/0133075 A1 * | 6/2008 | St-Pierre ................ B63H 11/08 |
| | | 701/21 |
| 2010/0114412 A1 | 5/2010 | Mizutani |
| 2011/0263167 A1 | 10/2011 | Chiecchi |
| 2011/0281477 A1 | 11/2011 | Inoue et al. |
| 2012/0272538 A1 | 11/2012 | Moore |
| 2013/0312651 A1 | 11/2013 | Gai |
| 2013/0340667 A1 | 12/2013 | Morvillo |
| 2014/0209007 A1 | 7/2014 | Morvillo |
| 2014/0224166 A1 | 8/2014 | Morvillo |
| 2014/0295717 A1 | 10/2014 | Kuriyagawa et al. |
| 2016/0068247 A1 | 3/2016 | Morvillo |
| 2018/0335788 A1 * | 11/2018 | Behling ................. B63B 45/00 |

OTHER PUBLICATIONS

Anschuetz et al., "System and Method for Trimming a Trimmable Marine Device With Respect to a Marine Vessel", Unpublished U.S. Appl. No. 15/003,326, filed Jan. 21, 2016.

Mercury Marine, 90-8M0076286 JPO Service Manual—Auto Trim Portion, Theory of Operation, Jul. 2013, p. 2A-5.

Mercury Marine, 90-8M0081623 JPO Owners Manual—Auto Trim Portion, Section 2—On the Water, May 2013, p. 21.

* cited by examiner

TRIM CONTROL SYSTEM AND METHOD

FIELD

The present disclosure relates to methods for controlling a trim position, and more specifically a rate of change of the trim position, of a trimmable marine device coupled to a transom of a marine vessel.

BACKGROUND

U.S. Pat. No. 4,318,699 discloses a sensor that responds to the operation of a marine transportation system to sense on-plane and off-plane conditions of a boat to operate a trim control to automatically position a trimmable drive for a desired boating operation. The preferred embodiment senses engine speed while an alternative embodiment senses fluid pressure opposing boat movement. The drive is moved to an auto-out position at high speeds and to a trimmed-in position at lower speeds.

U.S. Pat. No. 4,490,120 discloses a hydraulic system for trimming and tilting an outboard propulsion unit, which includes both trim piston-cylinder units and a trim-tilt piston-cylinder unit. The flow of hydraulic fluid from the reversible pump is controlled by a spool valve. A pressure relief valve is mounted in the spool to maintain pressure on one side of the spool when the pump is turned off to rapidly close the return valve and prevent further movement of the piston-cylinder units.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 7,347,753 discloses a hydraulic system for a sterndrive marine propulsion device that directs the flow of hydraulic fluid through the body and peripheral components of a gimbal ring in order to reduce the number and length of flexible hydraulic conduits necessary to conduct pressurized hydraulic fluid from a pump to one or more hydraulic cylinders used to control the trim or tilt of a marine drive unit relative to a gimbal housing.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 9,694,892 discloses a method for controlling a trim system on a marine vessel includes receiving an actual trim position of a trimmable marine device at a controller and determining a magnitude of a trim position error by comparing the actual trim position to a target trim position with the controller. The method also includes determining a magnitude of an acceleration rate of the marine vessel. The controller determines the activation time of a trim actuator coupled to and rotating the marine device with respect to the marine vessel based on the magnitude of the trim position error and the magnitude of the acceleration rate. The controller then sends a control signal to activate the trim actuator to rotate the marine device toward the target trim position. The method includes discontinuing the control signal once the activation time expires to deactivate the trim actuator. A corresponding system is also disclosed.

U.S. Pat. No. 9,745,036 discloses a trim control system automatically controls trim angle of a marine propulsion device with respect to a vessel. A memory stores trim base profiles, each defining a unique relationship between vessel speed and trim angle. An input device allows selection of a base profile to specify an aggressiveness of trim angle versus vessel speed, and then optionally to further refine the aggressiveness. A controller then determines a setpoint trim angle based on a measured vessel speed. If the user has not chosen to refine the aggressiveness, the controller determines the setpoint trim angle from the selected base profile. However, if the user has chosen to refine the aggressiveness, the controller determines the setpoint trim angle from a trim sub-profile, which defines a variant of the relationship between vessel speed and trim angle defined by the selected base profile. The control system positions the propulsion device at the setpoint trim angle.

U.S. Pat. No. 9,751,605 discloses a method for controlling a trim system on a marine vessel includes receiving an actual trim position of a trimmable marine device at a controller and determining a trim position error by comparing the actual trim position to a target trim position with the controller. The method also includes determining an acceleration rate of the marine vessel. In response to determining that the trim position error exceeds a first error threshold and the magnitude of the acceleration rate exceeds a given rate threshold, the controller commands the marine device to the target trim position. In response to determining that the trim position error exceeds the first error threshold and the acceleration rate does not exceed the given rate threshold, the controller commands the marine device to a setpoint trim position that is different from the target trim position. An associated system is also disclosed.

U.S. Pat. No. 9,919,781 discloses systems and methods for controlling position of a trimmable drive unit with respect to a marine vessel. A controller determines a target trim position as a function of vessel or engine speed. An actual trim position is measured and compared to the target trim position. The controller sends a control signal to a trim actuator to trim the drive unit toward the target trim position if the actual trim position is not equal to the target trim position and if at least one of the following is true: a defined dwell time has elapsed since a previous control signal was sent to the trim actuator to trim the drive unit; a given number of previous control signals has not been exceeded in an attempt to achieve the target trim position; and a difference between the target trim position and the actual trim position is outside of a given deadband. The method may include sending a second control signal for a defined brake time to trim the drive unit in an opposite, second direction in response to a determination that the actual trim position has one of achieved and exceeded the target trim position.

The above U.S. patents and applications are hereby incorporated by reference herein in their entireties.

SUMMARY

In one embodiment, a trim control system for controlling a relative position of a trimmable marine device with respect to a marine vessel hull includes a trim actuator coupled to the trimmable marine device about a horizontal trim axis. The trim control system further includes a trim control module executable on a processor and configured to identify a target trim position for the trimmable marine device, determine a desired trim rate of change to rotate the trimmable marine device about the horizontal axis from a current trim position toward a target trim position, and operate the trim actuator to rotate the trimmable marine device at the desired trim rate of change toward the target trim position.

In one embodiment, a method for controlling a relative position of a trimmable marine device with respect to a marine vessel hull includes identifying a target trim position for the trimmable marine device, and determining, with a processor, a desired trim rate of change to rotate the trimmable marine device about a horizontal trim axis from a current trim position toward the target trim position. The method further includes determining a motor speed of a trim actuation motor to rotate the trimmable marine device at the desired trim rate of change and controlling the trim actuation motor to operate at the motor speed.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present disclosure relates to systems and methods for controlling one or more trim actuators on a marine vessel so as to control the rate at which a trim position of a trimmable marine device is changed about a trim axis. Those skilled in the art of marine vessel propulsion and control are familiar with many different ways in which the trim position of a marine device such as an outboard motor or stern drive can be varied to change the handling or fuel efficiency of the vessel. For example, many manual trim control systems are known to those skilled in the art. In typical operation, the operator of a marine vessel can change the trim angle of an associated outboard motor, such as corresponding to the velocity of the vessel. This is done to maintain an appropriate angle of the vessel with respect to the water as it achieves a planing speed and as it increases its velocity over the water while on plane. Examples of such a trimmable marine device include, but are not limited to: trim tabs, trim deflectors, trim interceptors, and/or marine propulsion devices such as outboard motors or lower units of stern drives.

Those skilled in the art of marine vessel propulsion and control are familiar with many different ways in which the trim position of a trimmable marine device—an outboard motor, stern drive, trim tab, trim deflector, etc.—can be varied to change the handling or fuel efficiency of the vessel. For example, many manual trim control systems are known to those skilled in the art. In typical operation, the operator of a marine vessel can change the trim angle of an associated outboard motor as the velocity of the vessel changes. The operator inputs a command to change the trim angle for example by using a keypad, button, or similar input device with "trim up" and "trim down" input choices.

The systems of the present disclosure may also be capable of carrying out automatic trim (auto-trim) methods, in which the marine device is automatically trimmed up or down with respect to its current position, such as depending on a desired attitude of the marine vessel with respect to vessel speed and/or engine speed. Auto-trim systems perform trim operations automatically, as a function of vessel speed and/or engine speed, without requiring intervention by the operator of the marine vessel. The automatic change in trim angle of the trimmable marine device enhances the operation of the marine vessel as it achieves planing speed and as it further increases its velocity over the water while on plane. For example, trimming the marine device can affect a direction of thrust of a propeller with respect to a vessel transom, as well as affect vessel roll and pitch.

Traditional marine stern drive and outboard drive systems include a trim actuator that is an electro-hydraulic trim-tilt system that rotates the respective drive about a tilt axis, which is used to vary the angle of propulsion with respect to the marine vessel to optimize the attitude of the marine vessel for a particular running condition. Varying the trim angle changes the propulsion force vector on the marine vessel, which serves to raise or lower the bow of the marine vessel, which allows optimization of handling, speed, and efficiency, both at high vessel speeds and at low vessel speeds. The trim system is also used to provide tilt functionality to fully raise the marine drive out of the water for service or trailering purposes, or to otherwise fully raise the trimmable marine device to an appropriate position for trailering and transport of the vessel.

One problem with current trim actuation systems is that they do not provide variable trim rates of change, or rotation speeds, for adjusting the trim position about the trim axis.

Existing trim actuation systems typically include a brushed reversible DC electric motor driving a hydraulic gear pump. Such trim actuation systems can only rotate the trimmable marine device about the trim axis at a single speed—i.e. only offering a single trim rate of change. Some prior art systems have used a dual displacement pump design to provide a dual speed trim/tilt rate of change, where one rate of change is provided when the system is in the trim region and a second rate of change, provided by activation of a second displacement pump, is provided in the tilt region. Here again, each displacement pump is designed to only offer one trim rate of change. Thus, such systems still only offer fixed rates of trim change within the trim region. Although dual rate systems provide a second, faster trim rate of change when tilting past the normal trim range, the trim rate of change within the trim region is still fixed.

Based on their experimentation and research in the relevant field, the inventors have recognized that current trim systems providing a fixed trim rate of trim movement are suboptimal for all applications. Fixed trim movement constitutes a compromise of a variety of optimum rates for various vessel types and conditions. For example, the optimum trim rate for a small fishing vessel to provide the most satisfying boat response for the operator is far higher than an optimal trim rate of change for a racing catamaran, and in fact is far too high to provide safe and effective trim adjustment due to the way each vessel reacts to a given change in trim angle. Very small changes in trim angle make a large difference on a racing vessel, where as a v-bottom fishing boat is much less reactive to trim change and requires significantly more trim angle change to effectuate the same change in the vessel's running attitude as the racing vessel. Moreover, a fixed rate of change is suboptimal for any one vessel because desired trim changes at high vessel speeds are likely to be small (and thus optimally require a slow movement of trim position) compared to the trim changes requested at slow vessel speeds (where an optimal trim rate of change is going to be much higher). For these reasons, a fixed rate trim system does not provide the sensitivity needed for an optimal trim system in any application, whether for racing, leisure, or sport boating.

Figure 6:
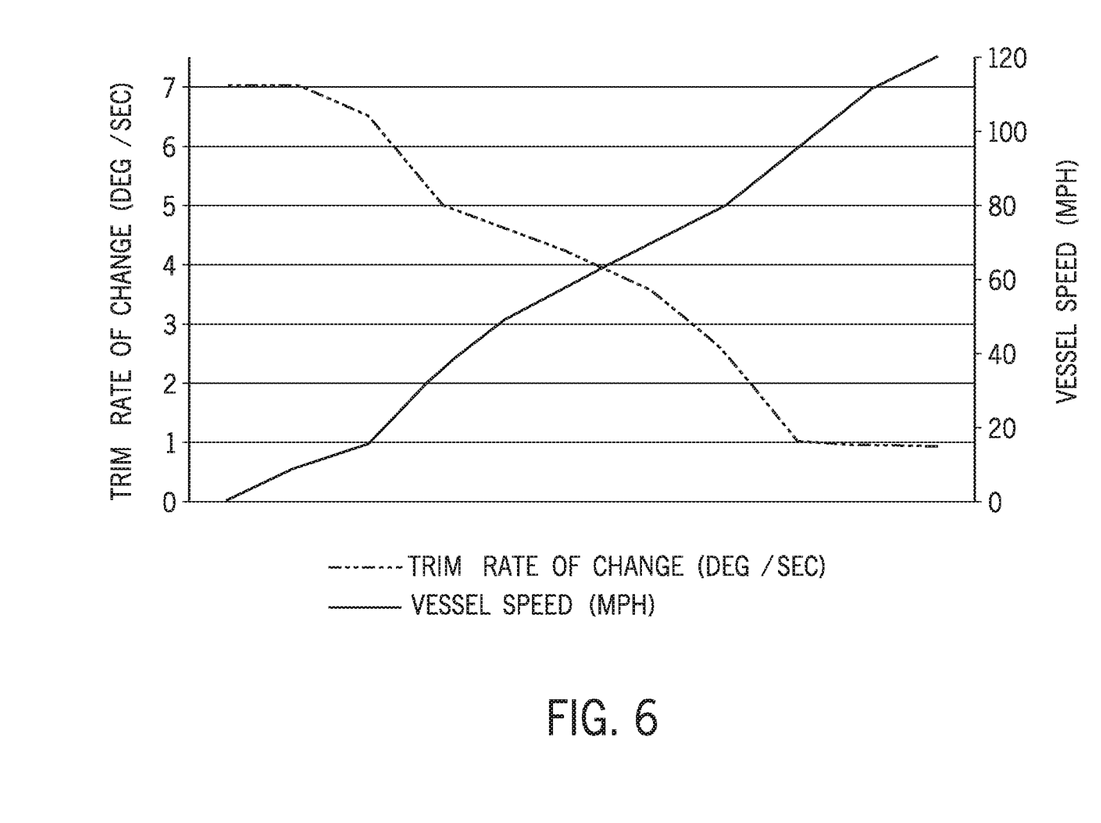
FIG. 6 is a graph exemplifying a trim rate of change profile based on vessel speed.

Based on their recognition of the forgoing problems and challenges with existing trim systems, the inventors developed the trim control systems and methods disclosed herein that provide a variable trim rate of change, and thus can adjust the trim angle at an optimal rate for a particular application and marine vessel, and/or provide a trim rate of change responsive to operator input. The disclosed system and method offer an ability to rotate the trimmable marine device about its trim axis at a desired trim rate of change, which can be adjusted based on various inputs including speed of the marine vessel, attitude of the marine vessel, a requested trim position or magnitude of requested trim change, vessel design and function, battery voltage, and/or user input. The trim rate of change control can be according to pre-set or user-tuned profiles for calculating trim rate of change based on inputs. FIG. 6 is a graph exemplifying one such trim rate profile, wherein the trim rate of change—i.e., the speed at which the trimmable marine device is moved between trim positions—is based on a defined relationship between vessel speed and trim rate of change. Alternatively or additionally, trim rate of change may be controlled based on user input, such as a user-set fixed trim rate of change or according to user input for contemporaneously and directly controlling the trim rate of change (such as a button or other user input element that allows a user to control the speed at which the trimmable marine device is rotated about the trim axis).

In one example, the trim actuator is a hydraulic piston-cylinder assembly in fluid communication with a hydraulic pump-motor combination providing variable speed control. Specifically, the trim actuator 16 (FIGS. 1 and 2) may include a trim actuator motor 32 that is a BLDC motor driving a hydraulic gear pump. The BLDC motor allows the pump to run at any speed within the BLDC motor's design range. When mated to a properly-sized hydraulic pump, a wide range of trim rates of change are possible. Accordingly, the trim actuator 16 is capable of continuous speed control between a minimum speed capability and a maximum speed capability of the motor 32. However, a person having ordinary skill in the relevant art viewing this disclosure will understand that the principles of some of the below examples could apply equally to pneumatic actuators, or other types of actuation devices.

The BLDC motor 32 is controlled by a commutation controller 38. Control software is also provided that determines instructions executed by the motor controller 38, such as to define a trim rate of change to be executed by the motor 32. For example, a trim control module 49 (FIG. 4) may be installed within the trim control system 44 that determines an optimum desired trim rate of change based on various inputs describing, for example, vessel speed, vessel attitude, a requested trim change magnitude, available battery voltage, and/or a user input to contemporaneously control a trim rate of change. Thus, the trim control module 49 is configured to determine the speed at which the target trim position is pursued (and, in auto-trim systems, may also determine the target trim position). Thereby, an appropriate trim rate of change can be defined and provided for optimally adjusting the trim or tilt angle of the trimmable marine device for any and every condition.

Figure 1:
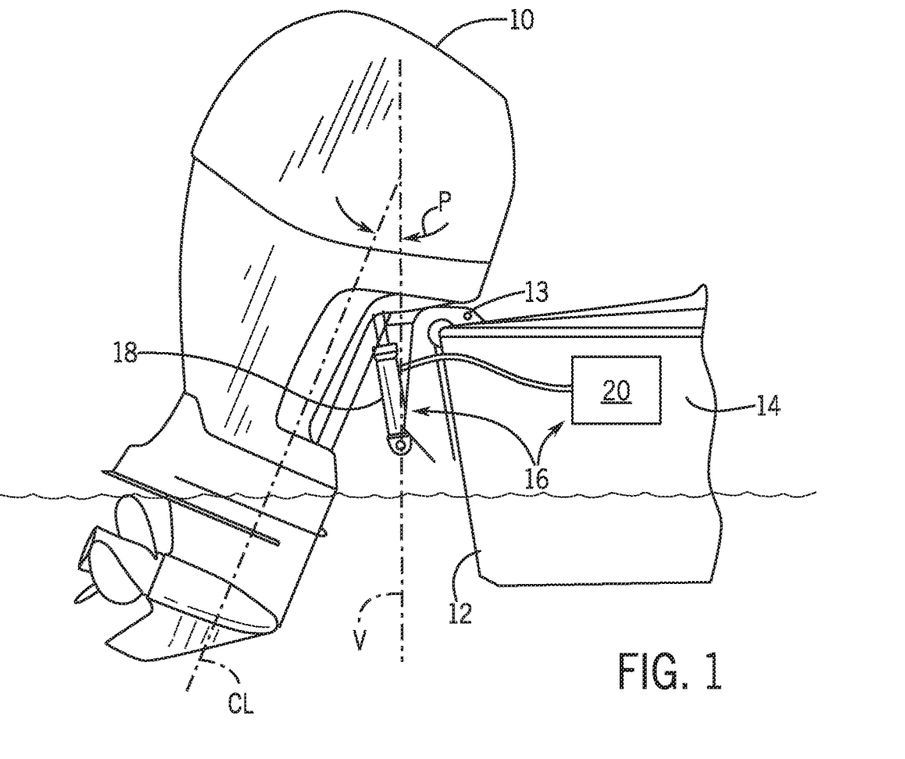
FIG. 1 illustrates an exemplary trimmable marine device, being a trimmable outboard drive unit mounted on a transom of a marine vessel.

Referring to FIG. 1, the position of a trimmable marine device 10 (such as the outboard motor shown herein) with respect to the transom 12 of a marine vessel 14 is controlled by a trim actuator 16. The trim actuator 16 may comprise a hydraulic piston-cylinder assembly 18 connected to a hydraulic pump-motor combination 20, which includes BLDC motor 32. The piston-cylinder assembly 18 has a first end (here, the cylinder end) coupled to the transom 12 of the marine vessel 14 and a second, opposite end (here, the rod end) coupled to the marine device 10, as known to those having ordinary skill in the art. The piston-cylinder assembly 18 operates to rotate the marine device 10 about a horizontal trim axis 13 to a trimmed-out position, to a trimmed-in position, or to maintain the marine device 10 in any position there between as the pump-motor 20 provides hydraulic fluid to the piston-cylinder assembly 18 to move the piston within the cylinder.

Figure 2:
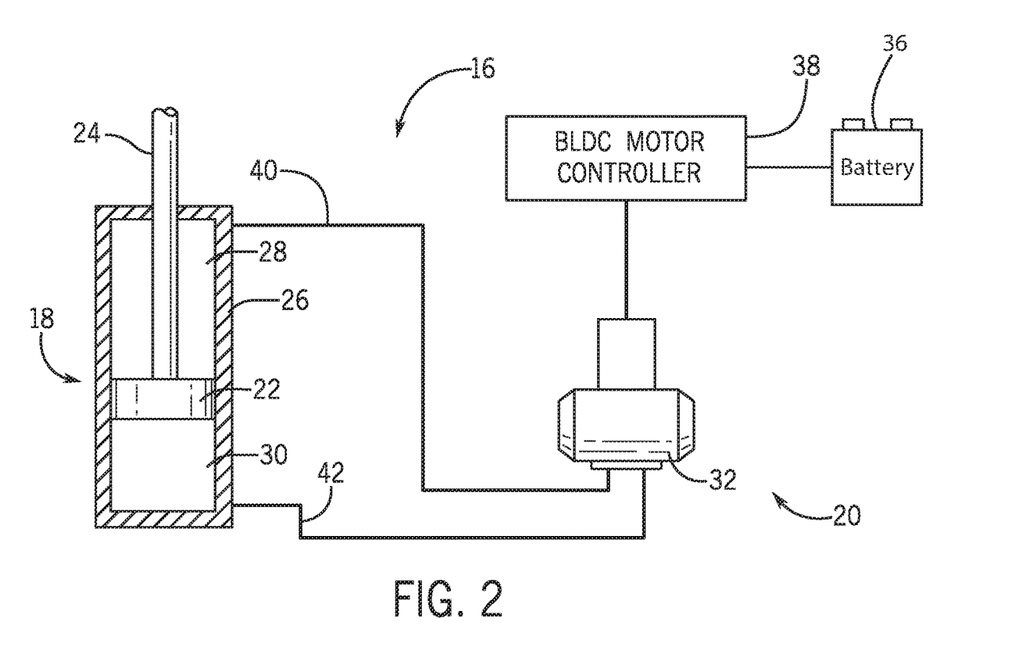
FIG. 2 schematically depicts an exemplary trim actuator system.

One example of a hydraulic trim actuator 16 is schematically depicted in FIG. 2. The piston-cylinder assembly 18 is shown schematically as having a piston 22 connected to a rod 24 disposed in a cylinder 26. The piston 22 defines a first chamber 28 within the cylinder 26 and a second chamber 30 within the cylinder 26, both of which chambers 28, 30 change in size as the piston 22 moves within the cylinder 26. The pump-motor combination 20 includes a variable speed trim actuation motor 32 (e.g, a BLDC motor) connected power the actuation motor 32 to effectuate a trim-in or trim-out movement of the trim actuator 16. For example, the motor controller 38 controls coupling a power source, such as a battery 36, to the actuation motor 32. In the depicted embodiment, the controller provides high current electrical power from the battery 36 directly to the actuation motor 32. In other embodiments, the motor controller 38 may power the actuation motor 32 through one or more relays or other switching means. A first hydraulic line 40 couples the pump-motor 20 to a first chamber 28 of the piston-cylinder assembly 18, and a second hydraulic line 42 couples the pump-motor 20 to the second chamber 30 of the piston-cylinder assembly 18. As long as the trim-in action is instructed, the pump-motor 20 provides hydraulic fluid through the first hydraulic line 40 to the first chamber 28 of the piston-cylinder assembly 18, thereby pushing the piston 22 downwardly within the cylinder 26 and lowering (trimming in) the marine device 10 coupled to the rod 24. As long as the trim-out action is instructed, the pump-motor 20 provides hydraulic fluid through the second hydraulic line 42 to the second chamber 30 of the piston-cylinder assembly 18, thereby pushing the piston 22 upwardly within the cylinder 26 and raising (trimming out) the marine device 10 coupled to the rod 24. Hydraulic fluid can be removed from the opposite chamber 28 or 30 of the cylinder 26 into which fluid is not being pumped in either instance, and drained to a tank or circulated through the pump-motor 20.

The trim actuation motor 32 provides feedback to the BLDC motor controller 38 regarding the phase, speed, position, and direction of the motor, thus facilitating appropriate control of the motor 32 to accurately effectuate the desired trim rate of change. BLDC motor commutation is well-known technology to a person having ordinary skill in the art. In short, by varying the voltage to each phase of the rotation sequence, the speed of the motor can be dictated. The voltages controlled through pulse width modulation of each of the rotation phases while that phase is energized. A common BLDC circuit consists of three phases within the motor stator, which are each energized in a sequential pattern to create the electromagnetism required to provide a reaction with the permeant magnet(s) mounted on a rotor within the motor 32. This results in rotation of the rotor/output shaft. To achieve precise controller of the stator phasing, or commutation, dedicated power switching electronics and software are required, which comprise part of the BLDC motor controller 38. The high speed, low level control receives inputs regarding the functionality of the motor 32, including the speed, direction, and relative position of the motor, so that commutation can be executed properly. For example, the control loop provided by the BLDC motor controller 38 may include an overall proportional integral (PI) controller for speed control, and another PI controller may be provided for torque (current) control. The BLDC motor controller 38 further includes control circuitry required to perform high current and high speed switching or motor commutation and position sensing via sensor or back EFM monitoring. Such control circuitry is matched to the motor 32 and configured for the intended application of trim actuation and control.

For purposes of this example, the BLDC motor controller 38 is treated as a stand-alone motor control module comprising hardware and software that is located at or near the pump motor system 20 of the trim actuator 16. In other embodiments, the BLDC motor controller 38 may be incorporated within a single control module (e.g. the central control module 45 in FIG. 4) to provide a single controller executing the trim system control operations. In still other embodiments, the BLDC motor controller 38 may be divided in any number of ways between a stand-alone motor control module for the trim actuator 16 (such as providing control circuitry at the trim actuator 16) and other control elements (such as providing control software or running the control circuitry incorporated in the central control module 45 or some other control element). In certain examples, the motor controller 38 communicates with the central control module 45—e.g., a power train control module (PCM) or a vessel control module (VCM). Specifically, the motor controller 38 may receive control signals from the central control module 45 dictating the desired trim rate of change, and the motor controller 38 may then effectuate operation of the trim actuator 16 accordingly. Higher-level control algorithms are implemented by the trim control module 49 comprising software instructions residing within the storage system 48 of the central control module 45. In the depicted embodiments, the trim control module 49 is provided in a separate central control module 45 (such as a VCM or PCM) in communication with the motor controller 38. However, a person having ordinary skill in the relevant art will understand in light of this disclosure that embodiments may be provided where the trim control module 49 and the motor controller 38 are integrated into a single hardware element or system, and that such embodiments are within the scope of this disclosure.

In this way, the trim actuator 16 can position the marine device 10 at different angles with respect to the transom 12. These may be a neutral (level) trim position, in which the marine device 10 is in more or less of a vertical position; a trimmed in (trimmed down) position; or a trimmed out (trimmed up) position, as shown respectively in FIGS. 3A-3C. A trimmed out position, as shown in FIG. 1 and FIG. 3C, is often used when the marine vessel is on plane and high speeds are required. At high speeds, the trimmed out position causes the bow 7 of the marine vessel 14 to rise out of the water, resulting in better handling and increased fuel efficiency. Thus, many auto-trim algorithms include determining a target trim position at which to orient the trimmable marine device 10 with the central control module 45 based on vessel speed. In other examples, the target trim position may be based on other vessel conditions, such as but not limited to engine speed, a combination of vessel speed and engine speed, or a tradeoff between vessel speed and engine speed depending on additional vessel conditions.

The motor control 38 may actuate the motor to achieve the target trim position, which may be defined by reference to a vertical line V. When the centerline CL of the marine device 10 is parallel to the vertical line V (FIG. 3A), the system may consider this to be zero trim. Non-zero trim can be quantified as a value T, which represents the angle between the centerline CL of the marine device 10 and the vertical line V. In FIG. 3B, the trimmable marine device 10 is shown in a trimmed in (trimmed down) position. The lines CL and V intersect below where the trimmable marine device 10 is connected to the transom 12. This may be referred to as a negative trim angle (−T) according to an exemplary convention. In FIG. 3C, the trimmable marine device 10 is shown in a trimmed out (trimmed up) position. The lines CL and V intersect above the drive unit's connection point to the transom 12. This may be referred to as a positive trim angle (+T).

Figure 3A:
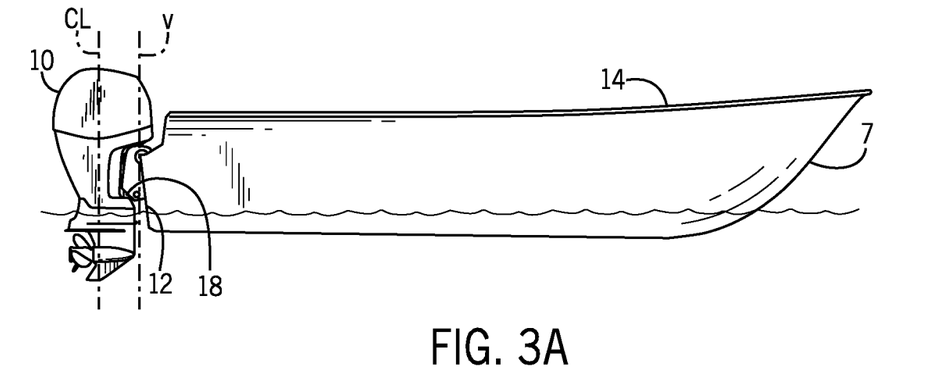
FIGS. 3A-3D illustrate a marine vessel having a trimmable marine device, where four different trim positions are illustrated.
Figure 3B:
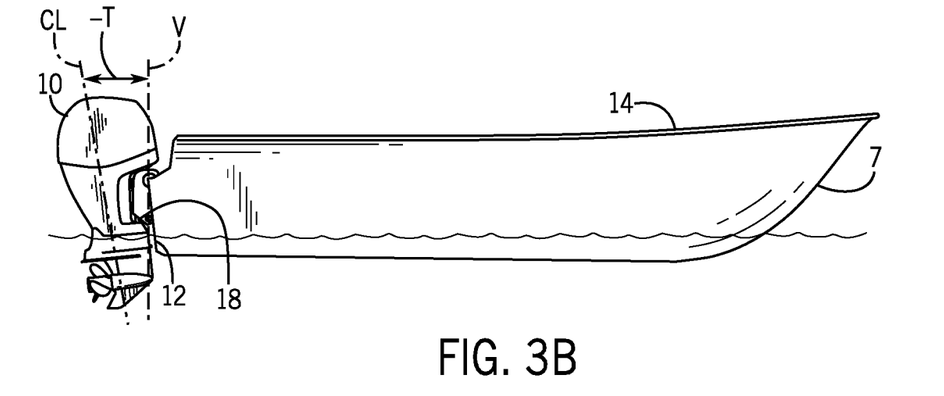
Figure 3C:
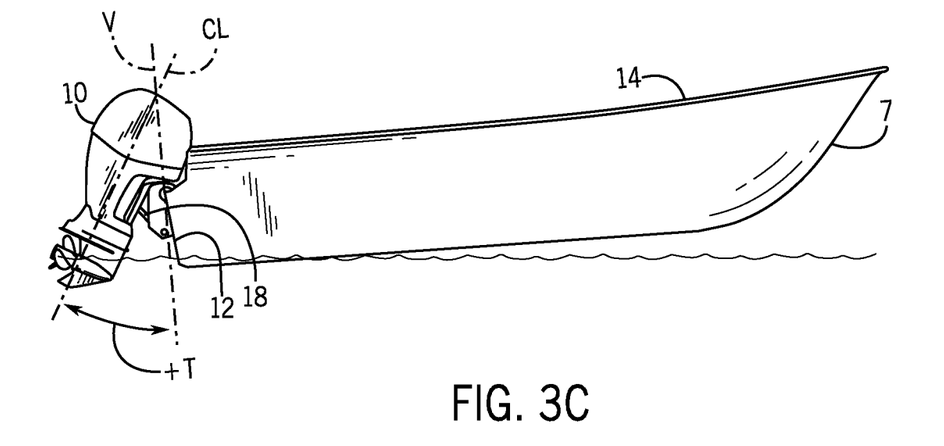

The positions in FIGS. 3A and 3B are generally used when the marine vessel 14 is operating at slower speeds. For example, the trim position shown in FIG. 3A is often used when the marine vessel is in a joysticking mode or is docking. The trim position in FIG. 3B is often used during launch of the marine vessel 14, before the marine vessel has gotten up to speed and on plane. This value T can be expressed as an angle (such as a positive or negative angle with respect to the center line CL), a percentage of a total angle to which the marine device 10 can be trimmed, a scalar value, a polar coordinate, or any other appropriate unit. For example, the angle T may be expressed as a percentage of total allowable trim angle, which can be measured from vertical, from a fully trimmed-out position, or from a fully-trimmed in position.

Figure 3D:
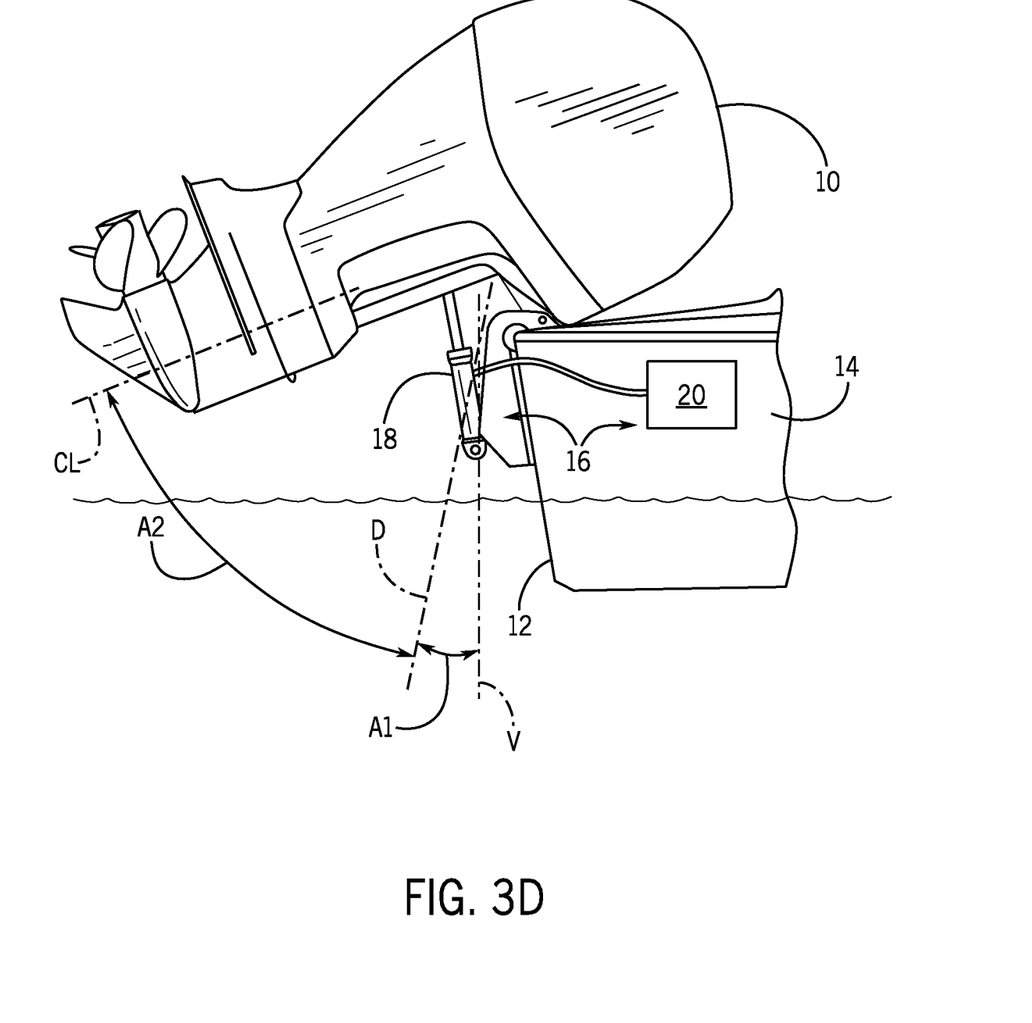

In one example, the maximum achievable trim position may include a tilt range of the trimmable marine device 10. For example, referring to FIG. 3D, the trimmable marine device 10 may be trimmable to an angle A1, where it is at angle from vertical V that provides a functional depth of the propeller in the water for propelling the vessel 14. The trimmable marine device 10 may further be trimmed to an angle A1+A2, such as where its centerline CL2 is at an angle from vertical V that raises the propeller out of the water altogether. Such a position is sometimes referred to as the marine device's 10 tilt range, which includes angles of the marine device 10 that may be required for towing the marine vessel or for trailering the vessel for transportation by land. The line D thus represents a demarcation between a trim range and a tilt range of the marine drive 10, which is provided for this explanation of tilt range. However, for simplicity, the trim and tilt ranges and positions are generally both referred to herein as the marine device's 10 "trim range", and all positions therein as the "trim positions" or "trim angles".

Figure 4:
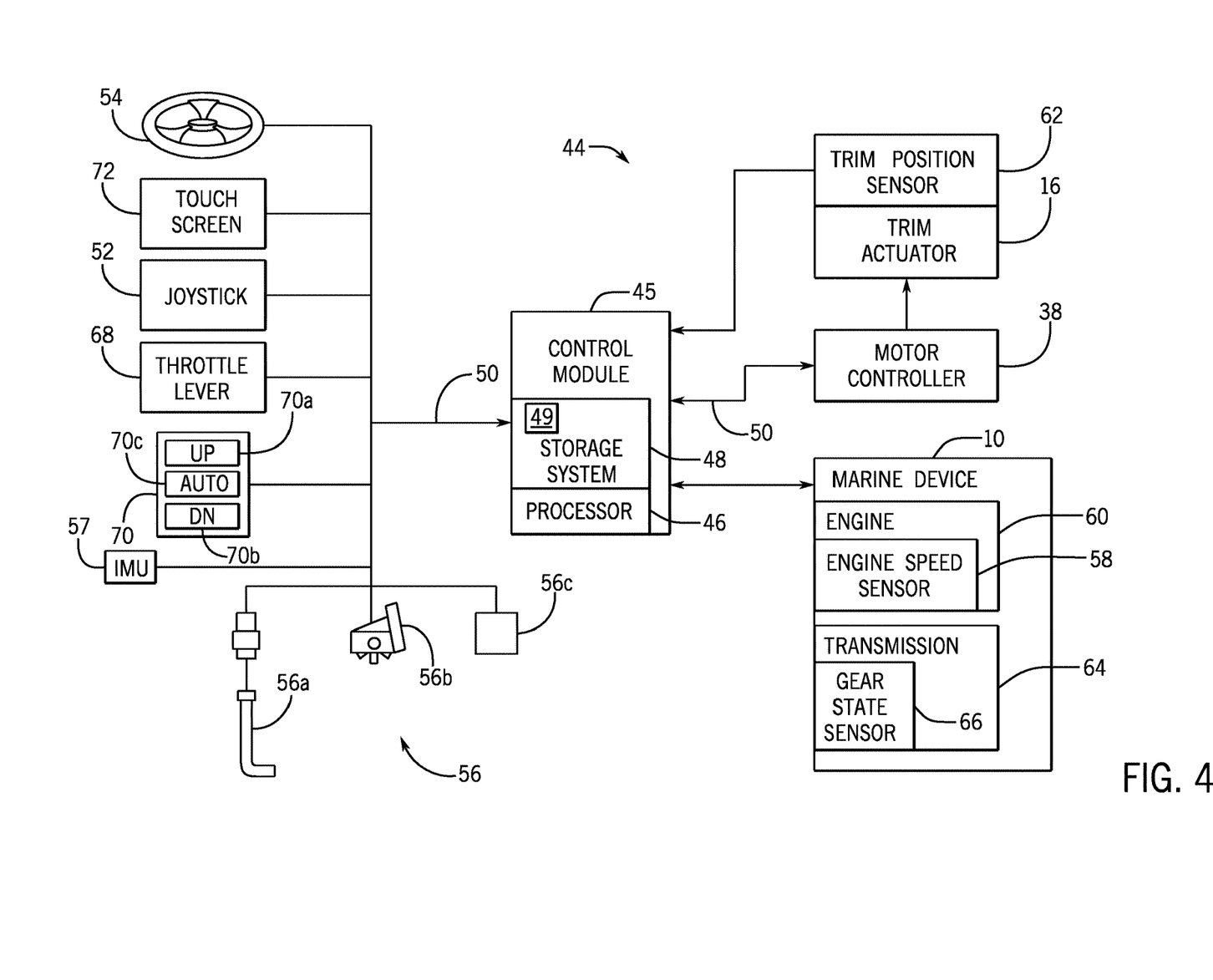
FIG. 4 schematically depicts an exemplary trim control system.

FIG. 4 shows a schematic of a trim control system 44 associated with the marine vessel 14 of FIG. 1. In the example shown, the system 44 includes the central control module 45, which is programmable and includes a processor 46 and a memory 48. The central control module 45 can be located anywhere in the system 44 and/or located remote from the system 44 and can communicate with various components of the marine vessel 14 via wired and/or wireless links, as will be explained further herein below. Although FIG. 4 shows a single central control module 45, the system 44 can include more than one control module 45. For example, the system 44 can have a control module 38 located at or near a helm of the marine vessel 14 (e.g., a VCM) and can also have one or more control modules located at or near the marine device 10 (e.g., an engine control module). Portions of the method disclosed herein below can be carried out by a single control module or by several separate control modules. One having ordinary skill in the art will recognize that the central control module 45 can have many different forms and is not limited to the example that is shown and described. For example, the central control module 45 may carry out the trim control method and propulsion control for the entire system 44, but in other examples separate trim control units and propulsion control units may be provided.

In some examples, the central control module 45 may include a computing system that includes a processing system, storage system, software, and input/output (I/O) interfaces for communicating with devices such as those shown in FIG. 4. The processing system loads and executes software from the storage system 48, such as software programmed with trim rate control instructions 49. When executed by the central control module 45, trim rate control software 49 directs the processing system to operate as described herein below in further detail to execute the trim control method. The computing system may include one or many application modules and one or more processors, which may be communicatively connected. The processing system can comprise a microprocessor (e.g., processor 46) and other circuitry that retrieves and executes software from the storage system. Processing system can be implemented within a single processing device but can also be distributed across multiple processing devices or sub-systems that cooperate in existing program instructions. Non-limiting examples of the processing system include general purpose central processing units, applications specific processors, and logic devices.

The storage system 48 can comprise any storage media readable by the processing system and capable of storing software. The storage system can include volatile and non-volatile, removable and non-removable media implemented in any method or technology for storage of information, such as computer readable instructions, data structures, program modules, or other data. The storage system can be implemented as a single storage device or across multiple storage devices or sub-systems. The storage system can further include additional elements, such as a controller capable of communicating with the processor 46. Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the central control module 45 communicates with one or more components of the system 44 via a communication link 50, which can be a wired or wireless link. The central control module 45 is capable of monitoring and controlling one or more operational characteristics of the system 44 and its various subsystems by sending and receiving control signals via the communication link 50. In one example, the communication link 50 is a controller area network (CAN) bus, but other types of links could be used. It should be noted that the extent of connections of the communication link 50 shown herein is for schematic purposes only, and the communication link 50 in fact provides communication between the central control module 45 and each of the sensors, devices, etc. described herein, although not every connection is shown in the drawing for purposes of clarity.

As mentioned, the central control module 45 may receive, either directly or indirectly, inputs from several different sensors and/or input devices aboard or coupled to the marine vessel 14. For example, the central control module 45 may receive a steering input from a joystick 52 and/or a steering wheel 54. The central control module 45 may receive an input from one or more vessel speed sensors 56. The vessel speed sensor 56 may be, for example, a Pitot tube sensor 56a, a paddle wheel type sensor 56b, or any other speed sensor appropriate for sensing the actual speed of the marine vessel. Alternatively or additionally, the vessel speed may be obtained by taking readings from a GPS device 56c, which calculates speed by determining how far the marine vessel 14 has traveled in a given amount of time. The marine device 10 is provided with an engine speed sensor 58, such as but not limited to a tachometer, which determines a speed of the engine 60 in rotations per minute (RPM). The engine speed can be used along with other measured or known values to approximate a vessel speed (i.e., to calculate a pseudo vessel speed). A trim position sensor 62 is also provided for sensing an actual position of the trim actuator 16, for example, by measuring a relative position between two parts associated with the trim actuator 16 The trim position sensor 62 may be any type of sensor known to those having ordinary skill in the art, for example a Hall Effect sensor or a potentiometer. Alternatively or additionally, the trim position sensor 62 may measure an actual angular position of the marine drives (such as a gyro or other angular position sensor located on the trimmable marine device 10).

A transmission 64 and gear state sensor 66 can also be provided for the marine device 10. For example, the gear state sensor 66 may provide an output indicating whether the transmission 64 is in a forward gear state, a neutral state, or a reverse gear state. In certain embodiments, the outputs of the gear state sensor 66 and/or the engine speed sensor 58 may be provided directly to the central control module 45. In other embodiments, the gear state and engine speed information may be provided to an intermediary control device, such as an engine control module, which may then make such information available to the central control module 45. FIG. 4 shows an instance in which the marine device 10 is an outboard motor, but in the instance that the marine device 10 is, for example, a stern drive or a trim tab, the transmission, engine, and their associated components would not be coupled to the trim actuator 16 as shown herein.

The system 44 may further include and vessel attitude sensor 57 sensing the orientation of the vessel with respect to an inertial frame of reference. For example, the vessel attitude sensor 57 may be an internal measurement unit (IMU) comprising a gyroscope, such as a three-axis gyroscope, to detect vessel orientation information. Alternatively or additionally, the attitude sensor 57 may include a magnetometer, or may include any other type of position or inertial measurement unit, such as a combination accelerometer and/or gyroscope with a magnetometer.

Other inputs to the system 44 can come from operator input devices such as a throttle lever 68, a keypad 70, and a touchscreen 72. The throttle lever 68 allows the operator of the marine vessel to choose to operate the vessel in neutral, forward, or reverse, as is known. The keypad 70 can be used to initiate or exit any number of control or operation modes (such as auto-trim mode), or to make selections while operating within one of the selected modes. In one example, the keypad 70 comprises an interface having a "trim up" button 70*a*, a "trim down" button 70*b*, and an "auto-trim on/resume" button 70*c*. The touchscreen 72 can also be used to initiate or exit any number of control or operation modes (such as trim up, trim down, or auto-trim mode), and in that case the inputs can be buttons in the traditional sense or selectable screen icons. The touchscreen 72 can also display information about the system 44 to the operator of the vessel, such as engine speed, vessel speed, trim angle, trim operating mode, vessel acceleration rate, etc. Alternatively or additionally, the touchscreen 72 may be configured to allow a user to input control instructions for controlling trim rate of change, such as to set trim rate profiles and/or to select a specific trim rate of change.

Figure 5:
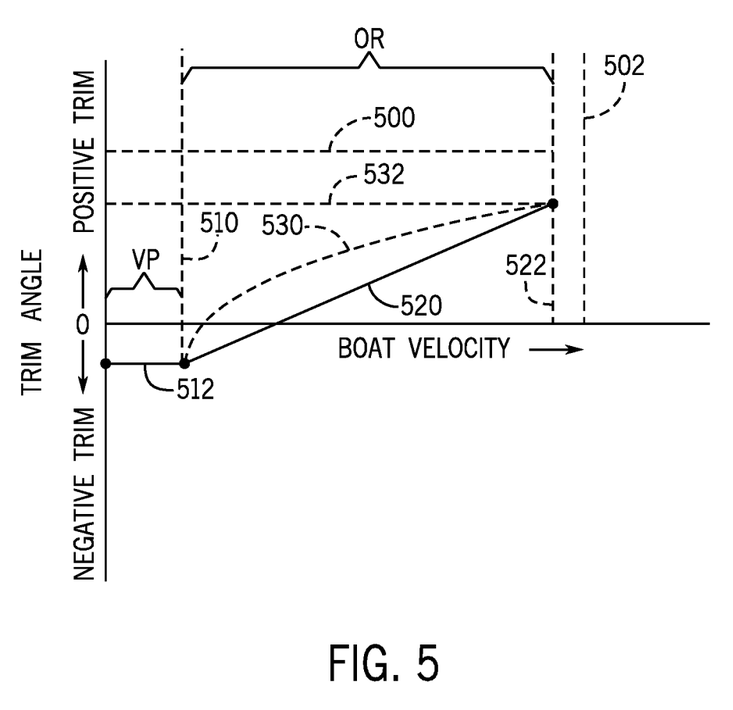
FIG. 5 is a graph showing an exemplary relationship between vessel speed and an automatically-commanded trim angle.

As mentioned, the central control module 45 may control the trim actuator 16 in an automatic mode, in which the central control module 45 sends control signals to the trim actuator 16 automatically, e.g., as a function of a speed of the vessel 14. For example, FIG. 5 is a graphical representation showing an exemplary relationship between the trim angle of a trimmable marine device 10 and the velocity of a marine vessel 14 according to an exemplary auto-trim method. It should be noted that the graph shown in FIG. 4 is meant to show position of a trimmable marine device 10, such as an outboard motor or a stern drive according to the positive and negative trim angle conventions described herein with respect to FIGS. 1-3. However, other conventions could be used in other examples. It should also be noted that the auto-trim method could instead relate trim angle to engine speed instead of vessel speed. The relationship between these two values could be similar to that shown here; however, a separate graphical illustration is not provided.

Dashed line 500 represents a maximum positive trim angle +T of the marine device 10 that will maintain the trimmable marine device 10 in the water at a functional position. Dashed line 502 represents the maximum velocity of the marine vessel 14. Dashed line 510 represents the planing speed of the marine vessel 14. Line 512 represents the change in velocity of the marine vessel 14 from a stationary condition to the achievement of planing speed at dashed line 510. This increase in velocity is identified as VP in FIG. 5. In one example, the trim angle of the marine device 10 is maintained at a negative magnitude of −T such as shown in FIG. 2. This negative trim angle is maintained until the marine vessel 14 reaches planing speed 510. Then, the trim angle is increased as a function of vessel speed as indicated by line 520 in FIG. 5. This continues until the marine vessel 14 achieves a velocity which is represented by dashed line 522. It can be seen that this velocity represented by dashed line 522 is less than the maximum velocity 502 of the marine vessel. The range of speeds between dashed lines 510 and 522 is identified as its operating range OR between first and second speed magnitudes during which the trim angle is changed, according to this example, as a function of the vessel speed. In FIG. 5, this rate of change is linear as represented by line 520. However, as represented by dashed line 530, this relationship need not be linear in all applications. Dashed line 532 represents the maximum trim that is achieved during automatic trim operation when the marine vessel achieves the second speed magnitude 522. In one example, this maximum trim is trim angle +T shown in FIG. 3C.

The disclosed trim control system and method may be configured to automatically determine a desired trim rate of change associated with each trim adjustment instruction generated by the auto-trim system as described above. Likewise, the system may provide a desired trim rate of change with each trim adjustment instruction generated in response to input from a user, such as via the keypad 70. In auto-trim embodiments, the desired trim rate of change may be calculated according to a trim profile set based on inputs. FIG. 6 is a graph depicting an exemplary relationship between vessel speed (in MPH) and trim rate of change. In the depicted example, the trim rate of change is fine tuned for a particular marine vessel, which provides a non-linear relationship between the trim rate of change and the vessel speed. As illustrated, the trim rate of change is at a maximum when the vessel speed as at a minimum and the trim rate of change is minimized when the vessel speed is at a maximum. Thus, the trim rate of change is calibrated to be slower when the vessel speed is high, thereby providing the ability to fine tune the trim position in very small increments. This enables increase preciseness of trim position control, as compared to prior art systems, which is especially useful for racing applications where slight trim changes in the range of 0.25° may be desired. Conversely, the disclosed system can provide very rapid trim changes at slow vessel speeds and when the vessel is at idle, thereby also providing a convenient and responsive system to large trim change requests made at idle and docking. In various embodiments, the trim profile may consist of, for example, one or more lookup tables or generated formulas for calculating a trim rate of change value based on measured vessel conditions or other inputs.

In various embodiments, the vessel speed may be an actual measured vessel speed, such as via one of the exemplary vessel speed sensors 56 depicted in FIG. 4. Alternatively, the vessel speed may be an approximated vessel speed, or pseudo vessel speed, calculated based on an engine's load percent, a measured mass air flow value (i.e., a MAF value), engine RPM and/or a rate of change of the engine RPM, and/or other engine parameters, as various method of calculating pseudo vessel speed are well known in the relevant art.

Accordingly, this relationship can be utilized by the trim control module 49 software to calculate the desired trim rate of change based on the measured or pseudo vessel speed. Any of various relationships may be determined and provided correlating trim rate of change to vessel speed and such profiles may be automatically set for the system based on a particular vessel configuration, or may be selectable and customizable by a user. For example, the trim rate of change profile may be pre-defined based on the engine capabilities.

Alternatively or additionally, the vessel trim rate of change may be adjusted based on variables other than vessel speed. For example, the trim control module 49 may be configured to calculate the desired trim rate of change based on vessel speed in combination with one or more other parameters, such as engine speed, gear state, a magnitude of the requested trim change, the requested target trim position, vessel attitude, battery voltage, and/or any number of other parameters. To provide one example, a maximum trim rate of change may be provided when the vessel speed is below a low vessel speed threshold (e.g. one mile per hour), and/or the engine speed is less than a low engine speed threshold (e.g., the idle set point engine speed), and/or that a gear state sensed by the gear state sensor 66 is neutral. For example if the engine is at idle and/or the gear state sensed by the gear state sensor 66 is a neutral gear state, and the maximum achievable trim position is requested (i.e. to tilt the trimmable marine device 10 out of the water), the trim control module 49 may automatically set the desired trim rate of change to the maximum achievable rotation speed to rotate the trimmable marine device, such as the outboard drive, to the maximum achievable trim position as quickly as possible. In still other embodiments, one or more other conditions may be required in order to apply a maximum rate of change for the trim actuator, such as requiring that the requested trim change magnitude be greater than a threshold magnitude that would warrant application of a maximum rotation rate of the trimmable marine device.

Likewise, the desired trim rate of change may be determined based on vessel speed in conjunction with vessel attitude, such as measured by the IMU 57 or other type of vessel attitude sensor. For example, the trim control module 49 may be configured to sense when the vessel is on plane, and to decrease the desired trim rate of change values accordingly, such that the trim is changed faster during the acceleration period and prior to the vessel getting on plane and, once the vessel is on plane, the rate of rotation for making trim adjustments is slowed so that more settled trim adjustments can be made. A similar effect may be achieved based on vessel speed alone, where the desired trim rate of change is reduced once the vessel speed reaches a pre-set planing speed threshold.

In certain embodiments, the desired trim rate of change may be determined based on a voltage level of the battery 36 powering the pump-motor 20. The system 44 may be configured to conserve electrical power when the battery voltage is low by decreasing the trim rate of change. For example, the trim control module 49 may be configured to determine whether the battery voltage is less than one or more voltage thresholds, and to decrease the trim rate of change as the available battery voltage crosses the one or more low voltage threshold(s). Such control may be provided in conjunction with the above-described vessel speed control logic. For example, the trim control module 49 may be configured to set a reduced maximum available trim rate of change based on the low battery voltage, thus prohibiting power-intensive high trim rates of change while allowing a lower trim rate of change in the instance of high vessel speed control.

In other embodiments, the desired trim rate of change may be determined based directly on user input that directly controls the desired trim rate of change. For example, a user may define a fixed desired trim rate of change, which could be any trim rate of change that has a corresponding motor speed within the minimum and maximum speed capabilities of the motor 32. Similarly, the user may define several desired trim rates of change, such as based on vessel speed or vessel attitude. For example, the user may define a first desired trim rate of control for pre-planing boat speeds, and a second, slower desired trim rate of change for use when the marine vessel is on plane. In other embodiments, the desired trim rate of change may be defined by the user in any number of ways. Such input may be provided, for example, via the touchscreen 72 comprising part of the user interface for the vessel. Similarly, the user may set trim rate of change profiles, as described above, via the touchscreen 72 portion of the user interface.

In still other embodiments, the trim rate of change may be contemporaneously controlled by the user, such as by utilizing pressure-sensitive trim control buttons 70a, 70b, where the desired trim rate of change is correlated to how hard or how far the key pad trim buttons 70a, 70b are depressed. For example, a pressure sensor may be provided as part of the keypad 70 which senses a pressure applied to the respective trim buttons 70a, 70b. Accordingly, the trim control module 49 may be configured to increase the trim rate of change based on how hard the trim buttons 70a, 70b is depressed. In certain examples, the system may be further configured to calculate the descried trim rate of change provided by the user based on a trim rate range selected based on the vessel speed. For example, a minimum and maximum applicable trim rate of change may be determined based on a vessel speed, and a value within that range may then be selected based on the user input.

In certain examples, the trim control module 49 may be configured to control motor 32 speed based on one or more input variables, such as vessel speed, such as in an open loop control configuration. For example, the trim rate of change may be calibrated and controlled according to the profile exemplified at FIG. 6. The trim motor speed is determined that effectuates the desired trim rate of change, and the BLDC motor controller 38 operates to maintain the assigned motor speed. In other embodiments, the trim control module 49 may be configured to operate a closed loop control mode based on an actual rate of change measured by the trim position sensor 62. The trim position sensor 62 may be provided within the trim actuator, or may be an angular position sensor placed on the trimmable marine device 10. Accordingly the speed of the trim motor 32 may be controlled such that an actual trim rate of change based on the measured actual trim position equals the desired trim rate of change. On a vessel with multiple trimmable marine devices 10, such as multiple outboard drives, controlling based on the actual trim rate of change of each device allows synchronization of trim rates such that all devices can be rotated at the same trim rate of change. In still other embodiments, the trim control module 49 may be configured to run a closed loop control algorithm around the target trim position and a trim command time, which is a time to reach the target trim position, and the motor speed can be controlled based on the measured actual trim rate of change.

Figure 7:
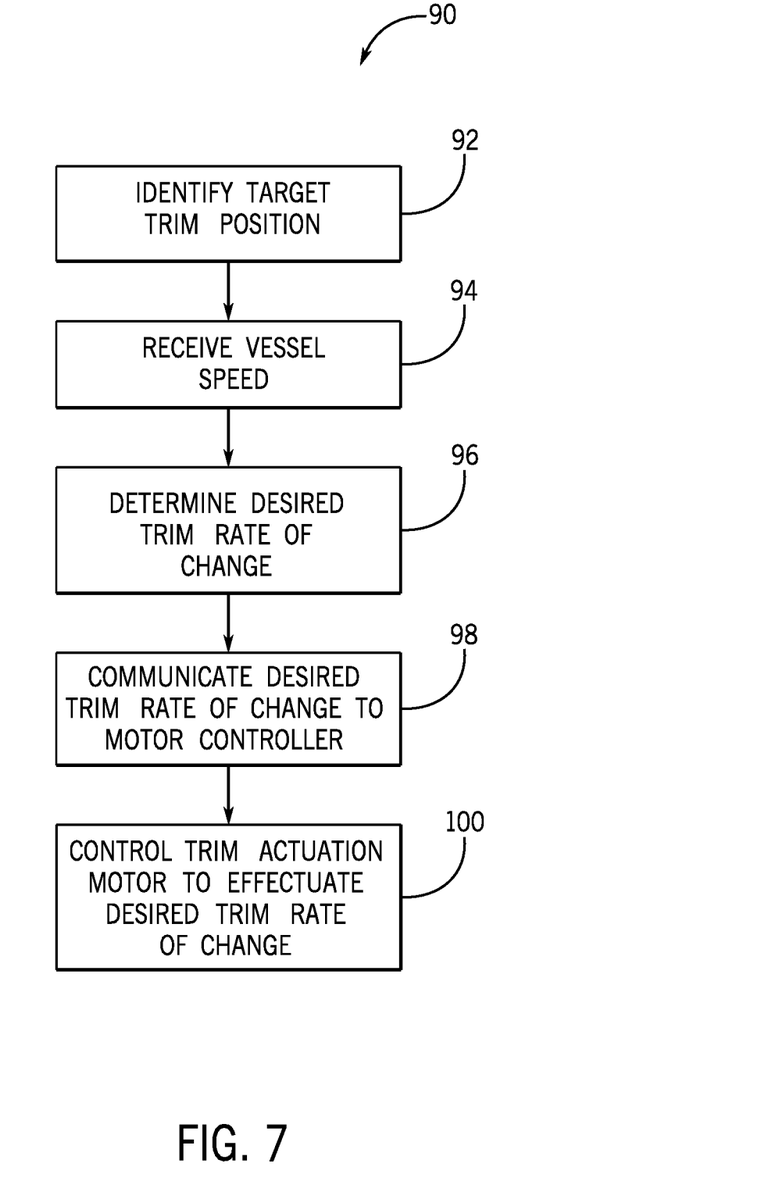
FIGS. 7-8 are flow charts exemplifying methods, or portions thereof, of controlling a relative position of a trimmable marine device.
Figure 8:
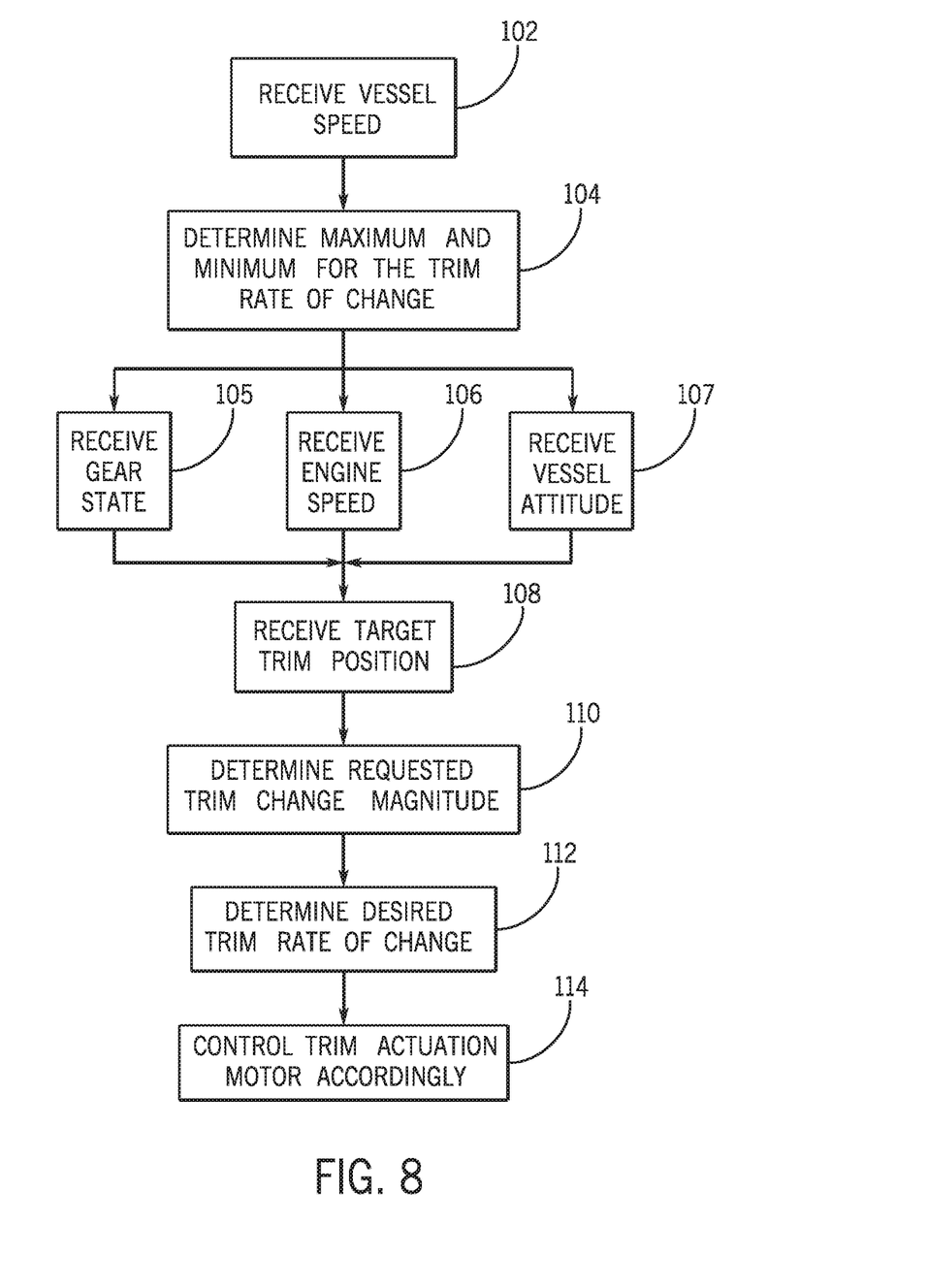

FIGS. 7 and 8 depict embodiments of methods, or portions thereof, for controlling trim position of a trimmable marine device 10. In the embodiment depicted in FIG. 7, the target trim position is identified at step 92. For example, the target trim position may be identified by the auto trim system. The target trim position may be identified based on input by a user to address the trim position. A vessel speed is received at step 94, such as via the one or more vessel speed sensors 56. Alternatively, the received vessel speed may be a pseudo vessel speed calculated based on one or more engine operation parameters, as described above. The desired trim rate of change is then determined based on the vessel speed at step 96, such as by utilizing a lookup table providing trim rate of change values based on vessel speed, such as an in accordance with a trim rate profile. The desired trim rate of change is then communicated to the motor controller 38 at step 98. In certain embodiments, the motor controller 38 then calculates an appropriate speed for the trim actuator motor 32, and corresponding control signals. The motor controller 38 then controls the trim actuator motor to effectuate the desired trim rate of change at step 100. In certain embodiments, the central control module 45 receives feedback from the trim position sensor 62, and may adjust the control instructions provided to the motor controller accordingly. For example, the trim control module 49 may be configured to calculate an actual trim rate of change based on two or more actual trim position measurements by the trim position sensor 62. The trim control module 49 may then provide instructions to the motor controller based on the actual trim rate of change as feedback in order to bring the actual trim rate of change in line with the desired trim rate of change.

FIG. 8 is a flow chart depicting another embodiment of a method for controlling trim position of a trimmable marine device 10. Vessel speed is received at step 102. Based on the vessel speed, a maximum and minimum rate of change are determined at step 104, which sets the upper and lower bounds for the possible trim rate of change to be determined by the trim control module 49 based on additional inputs and conditions of the marine vessel. A gear state of the transmission 64 is received at step 105; an engine speed is received at step 106, such as from an engine speed sensor 58; and a vessel attitude is received at step 107, such as from an IMU 57 or other vessel attitude sensors. A target trim position is received at step 108, such as from an auto trim system or from user input to adjust trim position. A requested trim change magnitude is determined at step 110 as a difference between the current trim position, such as the current output of the trim position sensor 62 and the target trim position. The desired trim rate of change is then determined at step 112, which is a value between the maximum and minimum values set at step 104 based on the vessel speed. This desired trim rate of change within the max and min bounds is determined based on one or more of the gear state, engine speed, vessel attitude, target trim position, and requested trim change magnitude. The trim actuator motor is then controlled accordingly at step 114 to effectuate movement of the trimmable marine device at the desired trim rate of change toward the target trim position.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A trim control system for controlling a relative position of a trimmable marine device with respect to a marine vessel hull, the trim control system comprising:
   a trim actuator coupled to the trimmable marine device and configured to rotate the trimmable marine device about a horizontal trim axis;
   a processor:
   a trim control module executable on the processor and configured to:
      identify a target trim position for the trimmable marine device;
      determine a desired trim rate of change to rotate the trimmable marine device about the horizontal trim axis from a current trim position toward the target trim position; and
      operate the trim actuator to rotate the trimmable marine device at the desired trim rate of change toward the target trim position.

2. The trim control system of claim 1, wherein the trim actuator includes a hydraulic piston-cylinder assembly in fluid communication with a hydraulic pump driven by a trim actuation motor that is a brushless DC electric motor; and
   wherein the trim control module is further configured to instruct the trim actuation motor to rotate at a speed associated with the desired trim rate of change.

3. The trim control system of claim 1, wherein trim control module is further configured to:
   receive a vessel speed; and
   determine the desired trim rate of change based on the vessel speed.

4. The trim control system of claim 3, further comprising a lookup table containing trim rate of change values based on vessel speed, wherein the trim rate of change values decrease as the vessel speed increases.

5. The trim control system of claim 3, wherein trim control module is further configured to reduce the desired trim rate of change when the vessel speed is above a planing speed threshold.

6. The trim control system of claim 3, wherein trim control module is further configured to determine the desired trim rate of change based further on a requested trim change magnitude between the target trim position and the current trim position.

7. The trim control system of claim 3, wherein trim control module is further configured to:
   receive a vessel attitude from an attitude sensor; and
   determine the desired trim rate of change based further on the vessel attitude.

8. The trim control system of claim 3, wherein trim control module is further configured to:
   determine at least one of a maximum trim rate of change and a minimum trim rate of change based on the vessel speed; and
   determine the desired trim rate of change based further on the maximum trim rate of change and/or the minimum trim rate of change and at least one of a requested trim change magnitude and a user input to control the desired trim rate of change.

9. The trim control system of claim 1, wherein the desired trim rate of change is determined based on a battery voltage level.

10. The trim control system of claim 1, wherein the desired trim rate of change is determined based on a user input.

11. The trim control system of claim 1, further comprising:
a trim position sensor that measures an actual trim position of the trimmable marine device;
determine an actual trim rate of change based on two or more actual trim position measurements from the trim position sensor; and
wherein the trim control module is configured to control the trim actuator such that the actual trim rate of change of the trimmable marine device equals the desired trim rate of change.

12. A method for controlling a relative position of a trimmable marine device with respect to a marine vessel hull, the method comprising:
identifying a target trim position for the trimmable marine device;
determining, with a processor, a desired trim rate of change to rotate the trimmable marine device about a horizontal trim axis from a current trim position toward the target trim position;
determining a motor speed of a trim actuation motor to rotate the trimmable marine device at the desired trim rate of change; and
controlling the trim actuation motor to operate at the motor speed.

13. The method of claim 12, further comprising:
receiving a vessel speed; and
determining the desired trim rate of change is based on the vessel speed.

14. The method of claim 13, wherein the desired trim rate of change decreases as vessel speed increases.

15. The method of claim 13, further comprising determining the desired trim rate of change based further on a requested trim change magnitude between the target trim position and the current trim position.

16. The method of claim 15, further comprising:
identifying that the requested trim change magnitude is greater than a threshold;
identifying that the vessel speed is less than a vessel speed threshold, that an engine speed is less than an engine speed threshold, or that a gear state is neutral; and
determining the desired trim rate of change to be a maximum rate of change for the trim actuation motor.

17. The method of claim 13, further comprising:
receiving a vessel attitude from an attitude sensor; and
determining the desired trim rate of change based further on the vessel attitude.

18. The method of claim 13, further comprising determining the desired trim rate of change based further on a user input to control the desired trim rate of change.

19. The method of claim 13, further comprising:
determining at least one of a maximum trim rate of change and a minimum trim rate of change based on the vessel speed; and
determining the desired trim rate of change based further on the maximum trim rate of change and/or the minimum trim rate of change and at least one of a requested trim change magnitude between the target trim position and the current trim position and a user input to control the desired trim rate of change.

20. The method of claim 13, further comprising:
receiving a user input to control the desired trim rate of change; and
wherein the desired trim rate of change is determined based on the user input.

* * * * *